(12) United States Patent
Rupple

(10) Patent No.: US 11,648,494 B1
(45) Date of Patent: May 16, 2023

(54) METHOD AND DEVICE FOR INSTALLING A WATER FILTER

(71) Applicant: James William Rupple, Chelan, WA (US)

(72) Inventor: James William Rupple, Chelan, WA (US)

(*) Notice: Subject to any disclaimer, the term of this patent is extended or adjusted under 35 U.S.C. 154(b) by 0 days.

(21) Appl. No.: 17/657,397

(22) Filed: Mar. 31, 2022

Related U.S. Application Data

(60) Provisional application No. 63/264,897, filed on Dec. 3, 2021.

(51) Int. Cl.
*B01D 29/96* (2006.01)
*B01D 29/11* (2006.01)

(52) U.S. Cl.
CPC .............. *B01D 29/96* (2013.01); *B01D 29/11* (2013.01)

(58) Field of Classification Search
CPC ................................ B01D 29/96; B01D 29/11
See application file for complete search history.

(56) References Cited

U.S. PATENT DOCUMENTS

| | | |
|---|---|---|
| 5,120,438 A | 6/1992 | Nakagawa et al. |
| 7,186,338 B2 | 3/2007 | Boisvert |
| 7,442,301 B2 | 10/2008 | Huda |
| 7,517,449 B2 | 4/2009 | Choi et al. |
| 7,695,619 B2 | 4/2010 | Kurth et al. |
| 8,883,004 B2 | 11/2014 | Hardouin et al. |
| 9,346,001 B2 * | 5/2016 | Kato .................... B01D 46/521 |
| 9,669,336 B2 | 6/2017 | Ikemizu |
| 9,782,706 B1 | 10/2017 | Levy |
| 10,099,162 B2 | 10/2018 | Prince et al. |
| 10,512,860 B2 | 12/2019 | Xu et al. |
| 10,940,411 B2 | 3/2021 | Heitele |
| 11,135,536 B2 | 10/2021 | Jeon et al. |
| 2008/0185323 A1 | 8/2008 | Kargenian |
| 2015/0290570 A1* | 10/2015 | Starck .................... B01D 29/21 |
| | | 210/184 |
| 2015/0369367 A1* | 12/2015 | Kuroki .................... F16J 15/30 |
| | | 277/543 |
| 2018/0134598 A1 | 5/2018 | Levy et al. |
| 2020/0197846 A1 | 6/2020 | Yoon |

FOREIGN PATENT DOCUMENTS

CN    104226005 A  * 12/2014
JP    3539776 B2  *  7/2004

* cited by examiner

*Primary Examiner* — Waqaas Ali
(74) *Attorney, Agent, or Firm* — Dunlap Bennett & Ludwig, PLLC; Anna L. Kinney

(57) ABSTRACT

A water filter cartridge guide includes a ring with inward facing protuberances and outward facing protuberances. The guide is operative to center a water filtration cartridge within a sump.

7 Claims, 4 Drawing Sheets

METHOD AND DEVICE FOR INSTALLING A WATER FILTER

CROSS-REFERENCE TO RELATED APPLICATION

This application claims the benefit of priority of U.S. provisional application No. 63/264,897, filed Dec. 3, 2021, the contents of which are herein incorporated by reference.

BACKGROUND OF THE INVENTION

The present invention relates to water filters and, more particularly, to a guide therefor.

There are 13 million households using wells for their water supply in the United States (USA). These wells serve approximately 40 million people. Most wells have a water filtration system. Depending on the quality of the well water, cartridges could be replaced multiple times a year. Thus, millions of cartridges are purchased each year. This number does not take into consideration the filtration systems used for irrigation to keep water nozzles from clogging and ruining crops.

If a cartridge in a water filtration system is not properly installed, it may result in contaminated water contaminating the whole water system and permanently damaged cartridges or cartridge housings. This may also lead to high costs in flushing and/or sanitizing the system.

Presently, when a cartridge is being installed into a water filtration system, the cartridge must be placed within a sump. The sump is then screwed into a housing cap. There is a nipple inside the housing cap which fits into a hole in the cartridge. The nipple ensures proper circulation of water through the cartridge. Therefore, the cartridge must be centered within the sump in order to fit over the nipple and allow the sump to screw into the housing cap. If the cartridge moves at all, the cartridge will not align with the nipple. The two must be correctly aligned for proper installation. This is difficult because the cartridge naturally wiggles or shifts out of place when attempting to screw the sump onto the housing cap. Because the cartridge is within the housing, the installer will not have a visual on the cartridge's alignment when installing and will have difficulty maintaining a proper alignment. Often, this results in many long and frustrating attempts before a proper installation.

As can be seen, there is a need for a device that enables easy and correct installation of a cartridge in a water filtration system.

SUMMARY OF THE INVENTION

In one aspect of the present invention, a water filter cartridge guide comprises a unitary ring including at least one inside protuberance on the ring extending radially inward and at least one outside protuberance on the ring extending radially outward.

In another aspect of the present invention, a method of installing a water filter cartridge comprises, providing a water filter cartridge guide comprising a unitary ring having at least one protuberance extending radially inwards and at least one protuberance extending radially outwards, seating the guide on a water filtration cartridge such that the at least one protuberance on the ring extending radially inward abuts the water filtration cartridge, inserting the water filtration cartridge into a sump such that the at least one protuberance of the ring extending radially outwards abuts an interior wall of the sump, coupling the sump to a housing.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

A general overview of the various features of the invention will be provided, with a detailed description following. Broadly, an embodiment of the present invention provides a device for installing a water filter cartridge.

The inventive device is a guide comprising a circular ring. The ring may be penannular. In some embodiments of the present invention, approximately one quarter of the ring is missing. A plurality of protuberances extend from the device. Outside protuberances extend radially outward, and inside protuberances extend radially inward. In some embodiments of the invention, at least one inside protuberance and at least one outside protuberance extend from the device. In some embodiments of the present invention, the guide comprises four inside protuberances and four outside protuberances. In some embodiments of the present invention the inside protuberances align with the outside protuberances.

The guide may slide or fit over an end of a water filter cartridge. The inside protuberances of the guide may abut an outer perimeter of the cartridge. Once the guide is set on the cartridge, the cartridge may slide into or be positioned in a sump. The outside protuberances of the guide may abut an interior wall of the sump. The guide centers the cartridge within the sump by bracing it against the interior walls of the sump. The guide prevents the cartridge from shifting or wiggling away from a center of the sump. The guide may hold the cartridge steady while the sump is coupled to a housing. The housing may include a housing cap. The sump may be installed or screwed into a housing or a housing cap may be installed or screwed to the sump.

The dimensions of the ring of the guide and the protuberances of the guide are not particularly limited by the present invention. The size and shape of the ring and protuberances may vary and accommodate different sized cartridges and/or sumps.

The guide may be a flexible material. The missing portion of or gap in the ring of the guide provides the guide additional flexibility and enables the guide to bend and accommodate various sized cartridges. Advantageously, the guide does not block a flow of the water through and around the cartridge when a filtration system is operating.

The guide may be composed of any suitable material compatible with potable water as approved by the National Sanitation Foundation (NSF). In some embodiments of the present invention, the guide is composed of polypropylene.

Figure 1:
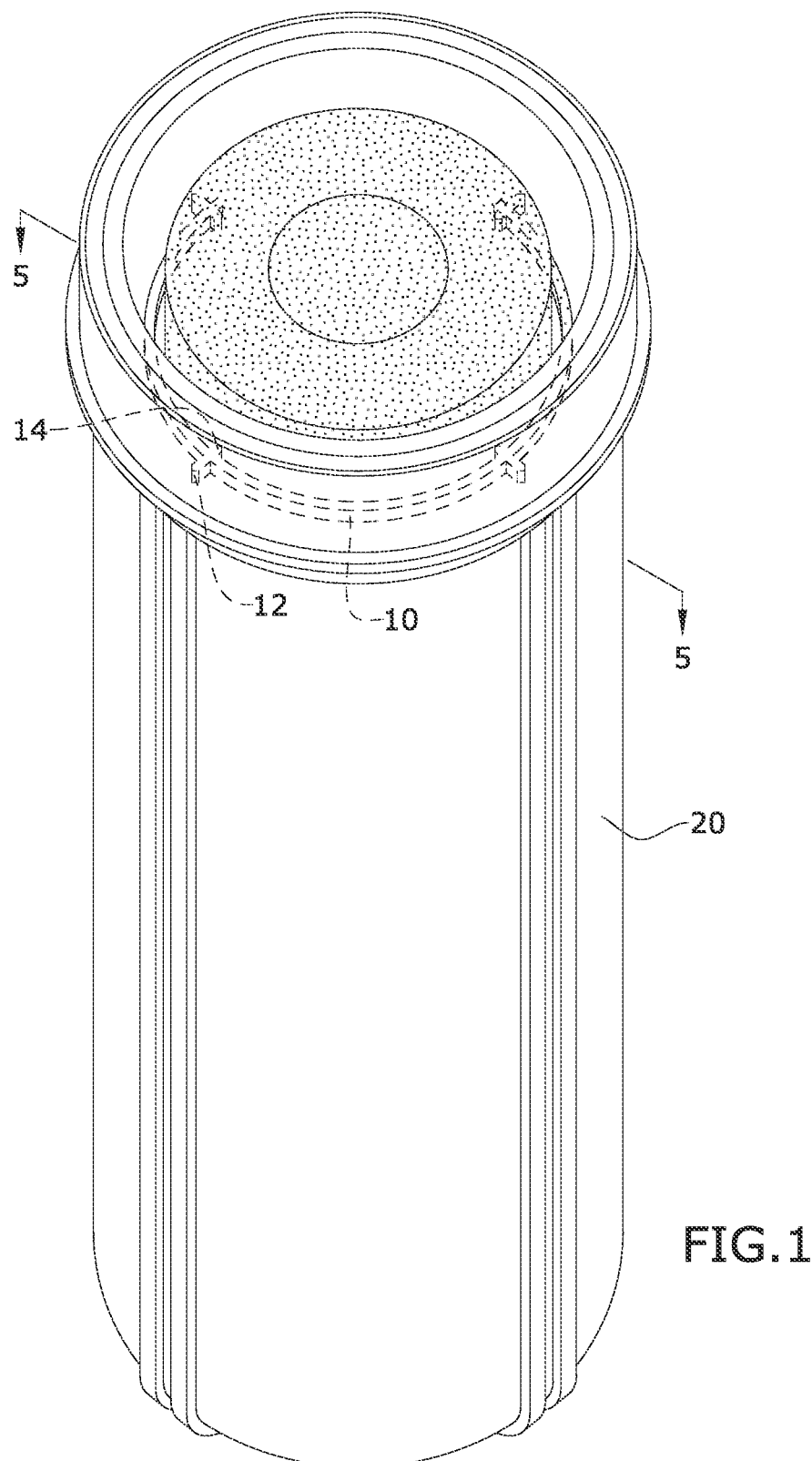
FIG. 1 is a perspective view of a guide according to an embodiment of the present invention, shown in use.
Figure 2:
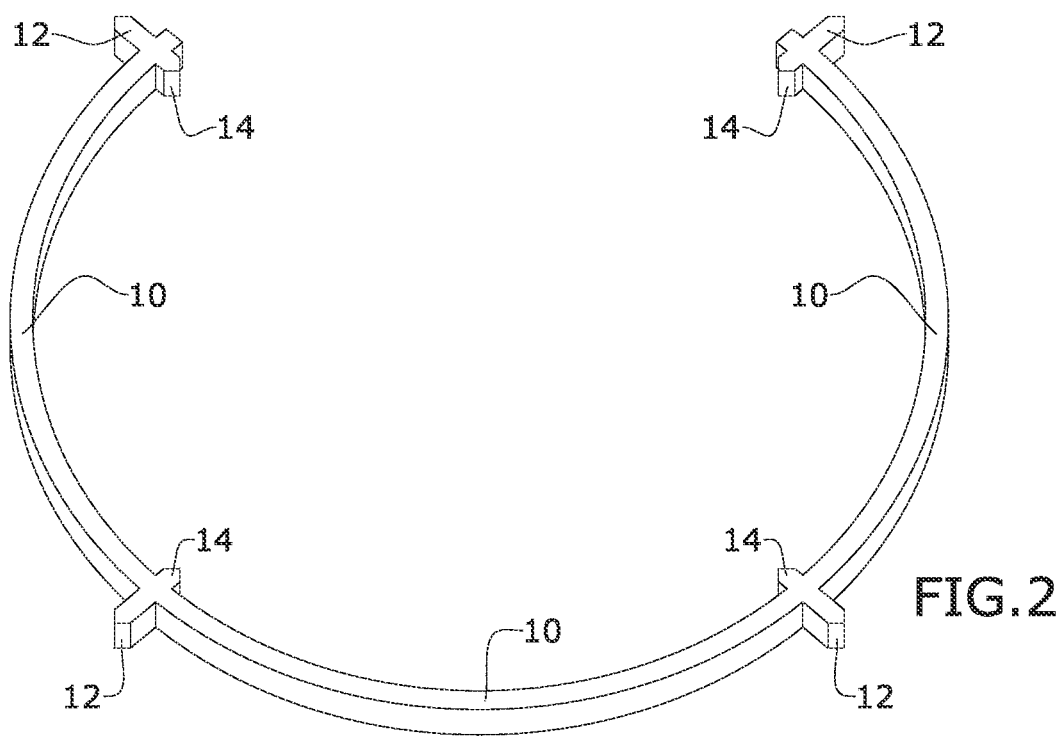
FIG. 2 is a perspective view thereof.
Figure 3:
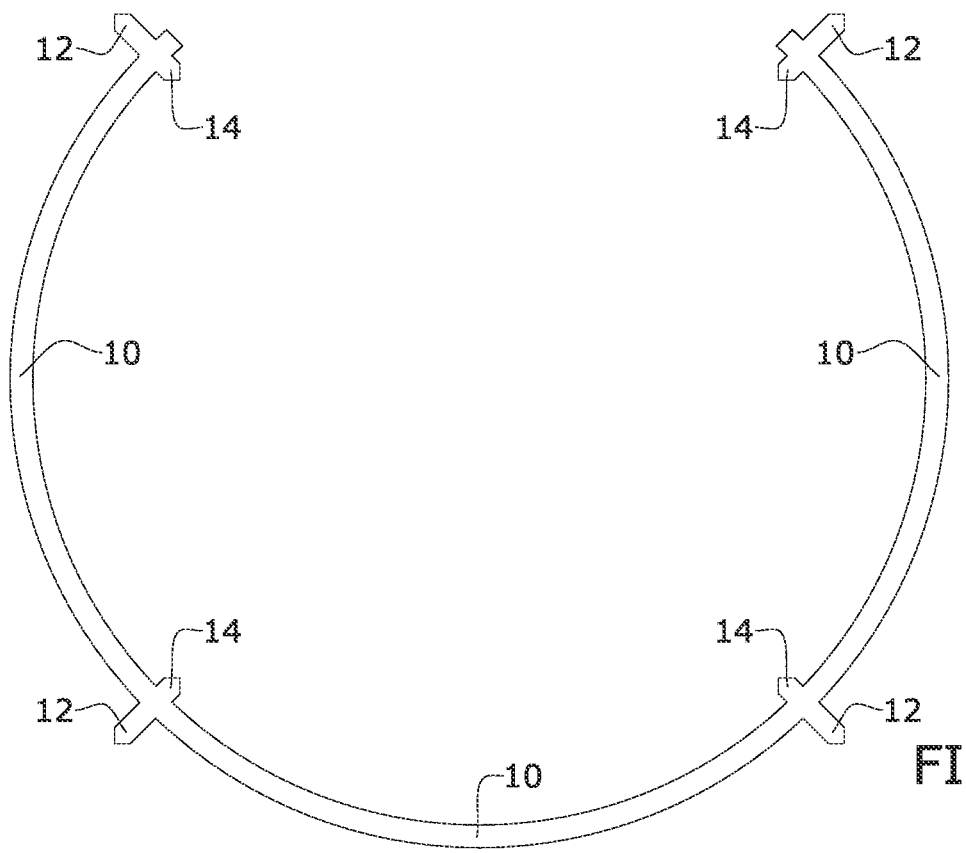
FIG. 3 is a top plan view thereof.

Referring now to the Figures, FIGS. 1 illustrates an embodiment of a guide 10, in use within a sump 20, more clearly depicted in FIGS. 2 and 3. The guide 10 comprises a penannular ring with equidistant inward facing radial protrusions 14 and outward facing radial protrusions 12. The outward facing radial protrusions 12 extend outward from the guide 10. The inward facing radial protrusions 14 extends toward a center of the guide 10 and are aligned with the outward facing radial protrusions 12.

Figure 4:
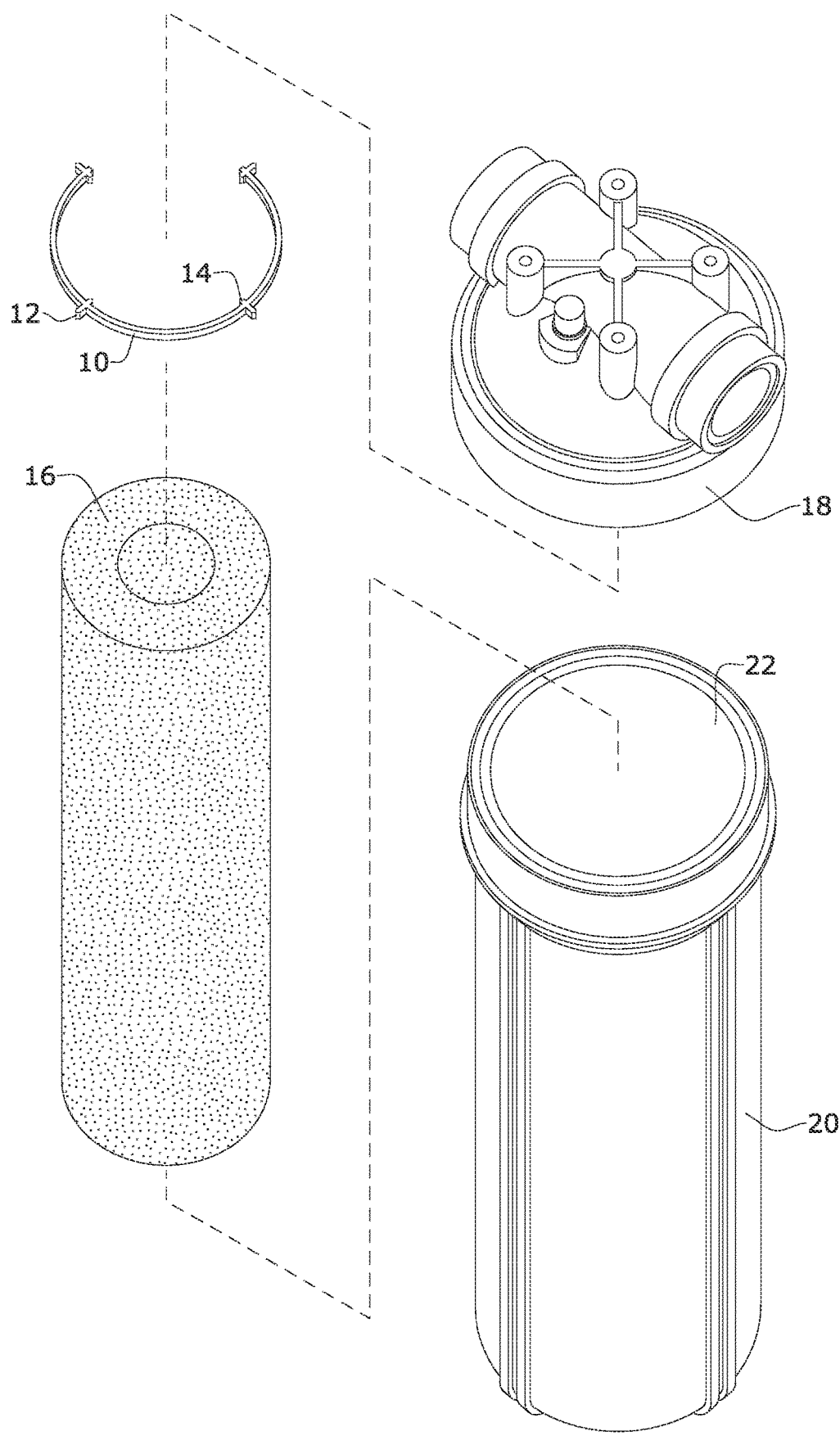
FIG. 4 is an exploded view of the guide and filter of FIG. 1.
Figure 5:
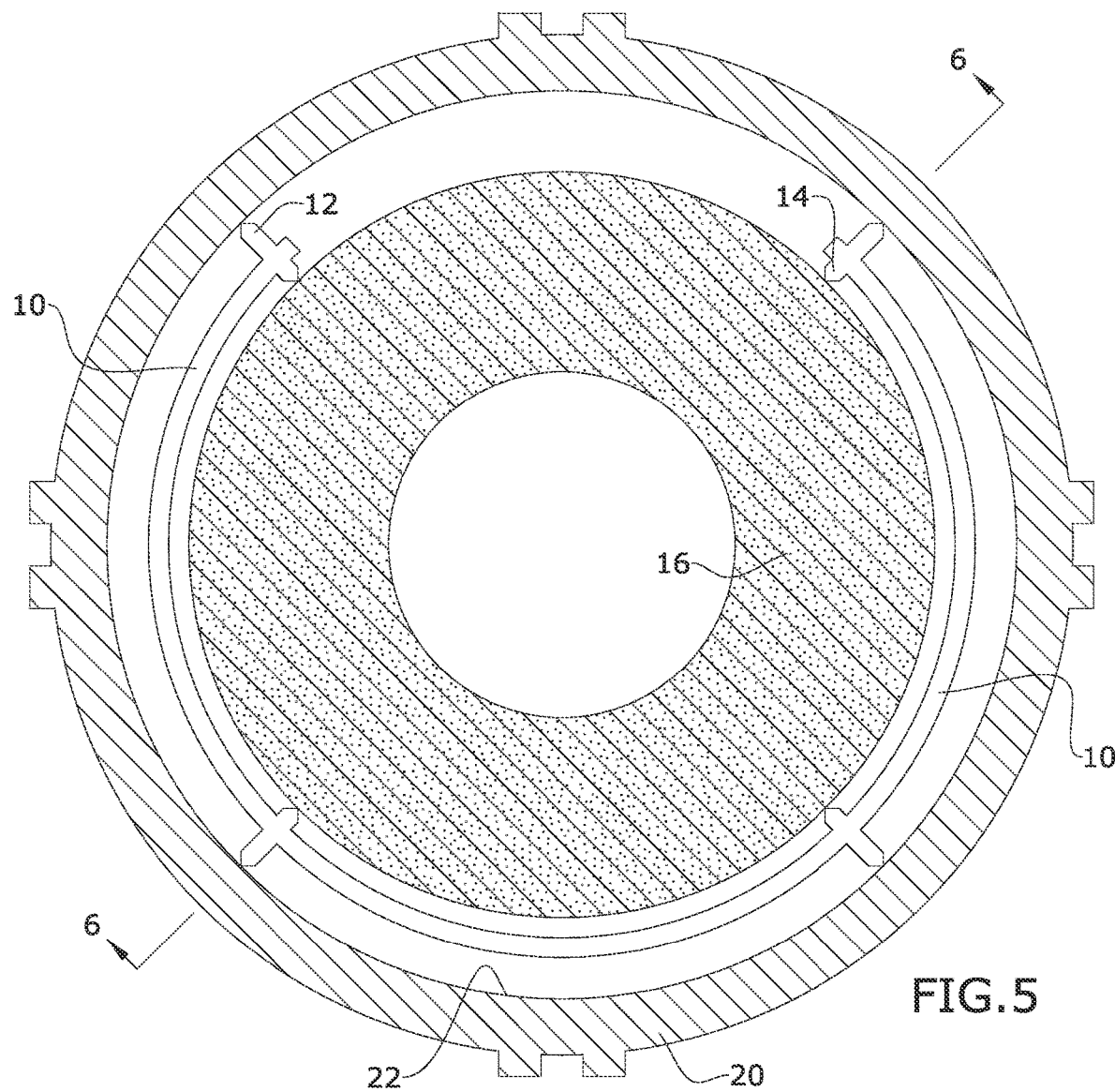
FIG. 5 is a section view taken on line 5-5 of FIG. 1.
Figure 6:
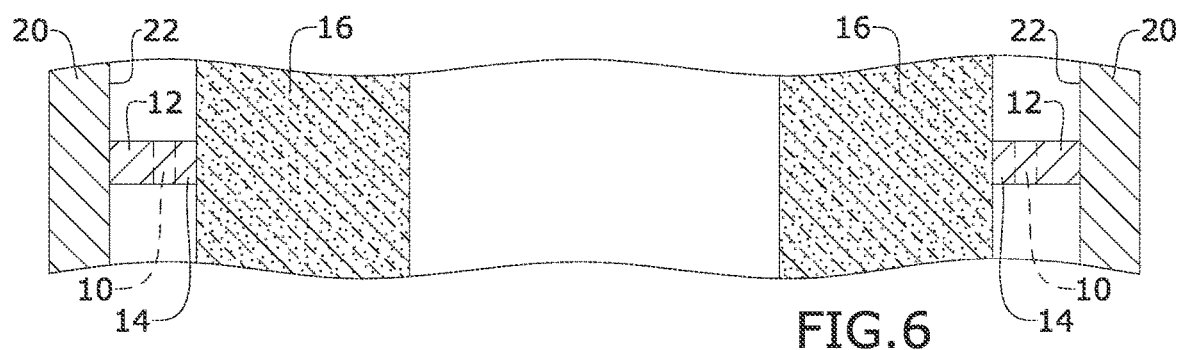
FIG. 6 is a section view taken on line 6-6 of FIG. 5.

In FIGS. 4 through 6, the guide 10 is shown seated on a water filtration cartridge 16. The water filtration cartridge 16 is inside of the sump 20. The sump 20 is installed on a housing cap 18. The inward facing radial protrusions 14 abut an exterior perimeter of the water filtration cartridge 16. The outward facing radial protrusions 12 abut an interior wall 22 of the sump 20 and snugly position the guide 10 in a center of the sump 20. The guide 10 aligns the water filtration cartridge 16 in the center of the sump 20. The sump 20 is screwed onto the housing cap 18. The guide 10 positions the water filtration cartridge 16 such that a nipple (not shown) centered on an internal surface (not shown) of the housing cap 18 is aligned with a central orifice of the water filtration cartridge 16.

It should be understood, of course, that the foregoing relates to exemplary embodiments of the invention and that modifications may be made without departing from the spirit and scope of the invention as set forth in the following claims.

What is claimed is:

1. A water filter cartridge guide, water filtration cartridge and sump combination system comprising:
   a cylindrical sump comprising an end with a screw connection for coupling to a housing cap;
   a water filtration cartridge positioned within the cylindrical sump and comprising a central orifice; and
   a unitary ring including
   at least one inside protuberance on the ring extending radially inward; and
   at least one outside protuberance on the ring extending radially outward;
   wherein, the unitary ring is removably positioned such that the at least one inside protuberance abuts the water filtration cartridge, and the at least one outside protuberance abuts the cylindrical sump;
   whereby the unitary ring constrains movement of the water filtration cartridge during attachment of the screw connection to a housing cap, thus permitting the central orifice of the water filtration cartridge to remain centered within the cylinder during said attachment;
   wherein the ring is penannular, thereby facilitating said removable positioning and the ring includes at least two inside protuberances and at least two outside protuberances.

2. The system of claim 1, wherein ring includes four equidistant inside protuberances.

3. The system of claim 1, wherein the ring includes four equidistant outside protuberances.

4. The system of claim 1, wherein the ring is composed of polypropylene.

5. The system of claim 1, wherein the ring is capable of bending during placement onto the water filtration cartridge as to accommodate a size of a water filtration cartridge.

6. The system of claim 1, wherein the ring is coaxially centers the central orifice of the water filtration cartridge within a sump.

7. The system of claim 1, wherein the ring includes at least three inside protuberances and at least three outside protuberances.

* * * * *